United States Patent
Aldred et al.

(10) Patent No.: US 7,017,779 B2
(45) Date of Patent: Mar. 28, 2006

(54) PORTABLE DISPENSER FOR DISPENSING FROZEN AERATED EDIBLE PRODUCTS

(75) Inventors: Alexander Aldred, Sharnbrook (GB); Richard Henry Luck, Sharnbrook (GB); David Needham, Sharnbrook (GB); Paul Anthony Trusty, Tultitlan (MX)

(73) Assignee: Good Humor - Breyers Ice Cream, division of Conopco, Inc., Green Bay, WI (US)

( * ) Notice: Subject to any disclaimer, the term of this patent is extended or adjusted under 35 U.S.C. 154(b) by 118 days.

(21) Appl. No.: 10/630,563

(22) Filed: Jul. 30, 2003

(65) Prior Publication Data

US 2004/0031808 A1    Feb. 19, 2004

(30) Foreign Application Priority Data

Jul. 30, 2002    (EP)    .................................. 02255299

(51) Int. Cl.
*A24F 27/14*    (2006.01)

(52) U.S. Cl. .................................. 221/150 R; 221/185

(58) Field of Classification Search ............ 221/150 R, 221/185, 197; 222/175, 389, 399; 224/148.1, 224/148.3
See application file for complete search history.

(56) References Cited

U.S. PATENT DOCUMENTS

| | | | |
|---|---|---|---|
| 4,721,237 A | 1/1988 | Leslie | |
| 5,242,125 A | 9/1993 | Rupp | |
| 5,893,485 A | 4/1999 | McGill | |
| 5,918,767 A * | 7/1999 | McGill | ........................ 222/95 |
| 6,098,849 A * | 8/2000 | McInnes | ..................... 222/175 |
| 6,607,775 B1 | 8/2003 | Aldred et al. | |

FOREIGN PATENT DOCUMENTS

| | | | |
|---|---|---|---|
| BR | PI9300463-0 A | * | 4/1994 |
| BR | 9300463-0 | | 10/1994 |
| DE | 196 31 858 | | 2/1998 |
| EP | 272 725 | | 6/1988 |
| EP | 0 369 723 | | 5/1990 |
| WO | 95/16634 | | 6/1995 |
| WO | 97/42096 | | 11/1997 |
| WO | 01/30176 | | 5/2001 |
| WO | 01/60173 | | 8/2001 |
| WO | 02/076233 | | 10/2002 |

OTHER PUBLICATIONS

European Search Report claiming priority of EP 02 25 5299 dated Jan. 3, 2003.
European Search Report claiming priority of EP 03 25 4418 dated Nov. 6, 2003.
Patent Abstracts of Japan, Publication No. JP 11 075701A, vol. 1999 No. 08.

* cited by examiner

*Primary Examiner*—Kenneth Noland
(74) *Attorney, Agent, or Firm*—Gerard J. McGowan, Jr.

(57) ABSTRACT

Frozen aerated edible product can be dispensed from single dose cartridges containing said frozen aerated edible product, using a portable dispenser comprising thermally insulated storing means for storing single dose cartridges containing said frozen aerated edible product, said thermally insulated storing means being adapted to be mounted on the back of a person, and dispensing means capable of holding a single dose cartridge containing said frozen aerated edible product outside the storing means, said dispensing means comprising discharge means capable of discharging frozen aerated edible product out of said single dose cartridge.

7 Claims, 3 Drawing Sheets

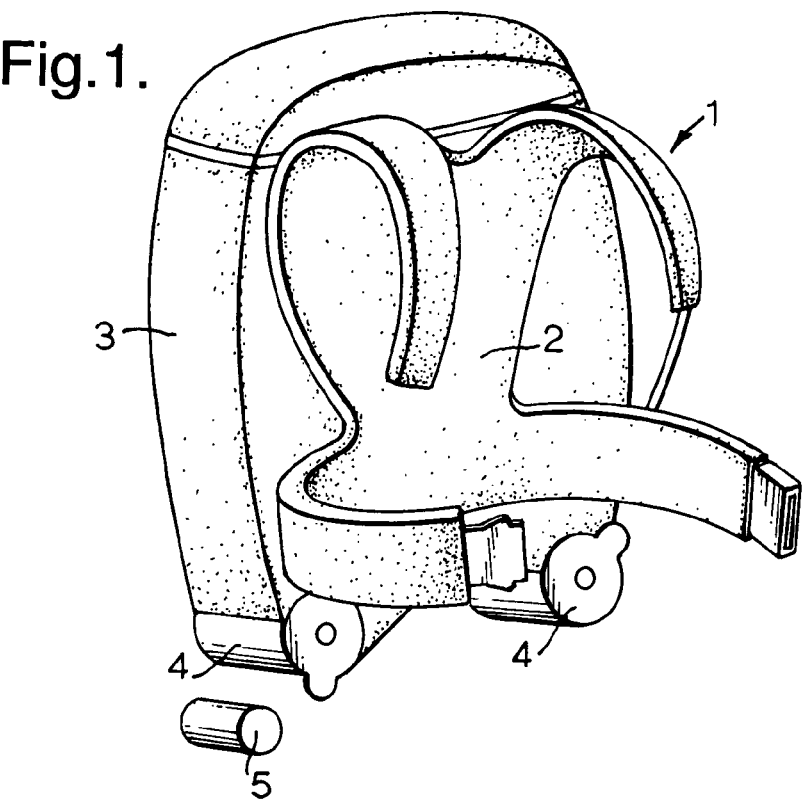
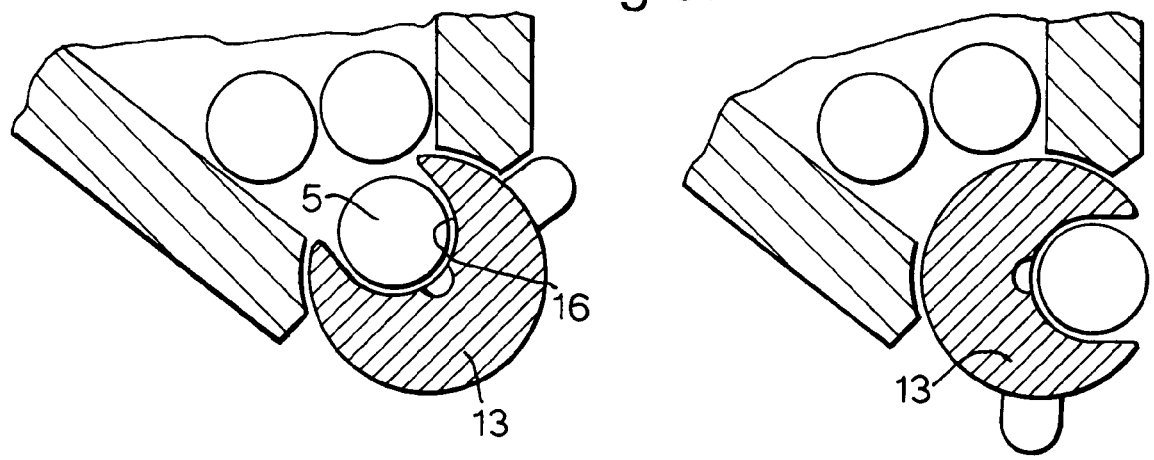

PORTABLE DISPENSER FOR DISPENSING FROZEN AERATED EDIBLE PRODUCTS

TECHNICAL FIELD

The present invention relates to a portable dispenser for dispensing frozen aerated edible products. The invention more particularly relates to a portable dispenser for dispensing ice cream.

BACKGROUND OF THE INVENTION

Self contained portable dispensing devices for ice cream have been proposed for some time. A typical one is described in WO95/16634 wherein such a device comprises a vessel for receiving and holding ice cream, said vessel being connected with a propellant and a discharge mechanism, and a pressurised container for the propellant, the whole device being contained within a housing mounted on the back of an operator.

Such a device suffers from major shortcomings which means that it did not result in a commercially successful product.

In order to be actually operated, the discharge mechanism must be situated on the front of the operator. Since the discharge mechanism is connected with the vessel in the back of the operator, it requires pipelines and articulated connections which are costly, difficult to maintain, and a huge hygiene hazard since they must be cleaned very properly everyday. Also, the whole pipelines and connections must be properly thermally insulated.

There is thus a need for a device which does not require pipelines and connection through which ice cream would have to flow and which would go from the back of the operator to the front.

It is now be found that by disconnecting the functions of storage and discharge, it is possible to achieve this goal.

Portable coolers for a number of beverage cans are known (See for example U.S. Pat. No. 4,721,237). Dispensing means for discharging viscous products from cartridges are known (See for example WO01/60173, EP369723, WO97/42096, U.S. Pat. No. 5,893,485 and U.S. Pat. No. 5,918,767). However it has not been proposed to provide a portable dispenser for dispensing frozen aerated edible product from a single dose cartridge which is easy to use (preferably one-handed) and which dispenses the product in a hygenic manner.

DEFINITIONS

"Insulated storing means" shall mean storing means with insulated walls, said insulated walls containing an insulating material having a thermal conductivity in the range of about 0.5 to about 75, preferably about 0.5 to about 50 milliwatt (meter Kelvin)$^{-1}$. The insulated material can be, for example, polystyrene, polyurethane, fibreglass, or vacuum.

"Cooling means" shall mean containers containing a phase change material with a thermal capacity of between about 150 and about 300 kiloJoule/kg over a temperature range of −25 to −5° C. Preferably the phase change material is a eutectic material.

"Independent" shall mean without pipe connection through which frozen aerated product can be transferred.

"Single-handed actuated" shall mean that the dispensing means filled with a single dose cartridge can be carried and the ice cream can be dispensed using a single hand, leaving the other hand free for other purposes.

BRIEF DESCRIPTION OF THE INVENTION

It is the object of the present invention to provide a portable dispenser for dispensing frozen aerated edible product from single dose cartridges containing said frozen aerated edible product, said dispenser comprising;

Thermally insulated storing means for storing single dose cartridges containing said frozen aerated edible product, said thermally insulated storing means being adapted to be mounted on the back of a person, and Dispensing means capable of holding a single dose cartridge containing said frozen aerated edible product outside the storing means, said dispensing means comprising discharge means capable of discharging frozen aerated edible product out of said single dose cartridge.

By using single dose cartridges, the dispensing means are only in two positions, full or empty. If the cartridge was a multi dose one, serious hygiene problems would still exist, particularly at the end of a vending session since the question of what to do with the product remaining in the cartridge in the dispensing means would immediately occur. Also since an undefined time can occur between two sales, having a multi dose cartridge in the dispensing means would necessitate further thermal insulation of said dispensing means.

Preferably, in the portable dispenser according to the invention, the dispensing means are independent from the storing means. It particularly means that the source of energy required for activated the discharge means is with the dispensing means itself.

Preferably also, the dispensing means are adapted to be mounted on the front of the person.

Most preferably, the dispensing means are single-handed actuated. It means that the operator can use his other hand, for example to hold a cup or a wafer cone into which the ice cream is going to be discharged.

Preferably the thermally insulated storage means are such that the temperature of thirty cartridges containing frozen aerated edible product stored within the storing means rises less than 5 degrees Celsius in a period of 1.5 hours when the ambient temperature outside the storing means is about 30° C. Most preferably also the thermally insulated storing means contains cooling means which allow the frozen products inside to be kept at the right temperature for at least about 4 hours.

Most preferably also, the thermally insulated storing means comprises delivery means adapted to deliver individual single dose cartridges containing frozen aerated edible product. This allows for minimum re-heating when a cartridge is taken out of the storing means.

In an even more preferred embodiment of the invention delivery means are situated at a bottom of the storing means. This allows for the cartridges to be individually delivered by gravity.

Preferably, the single dose cartridges are frusto-conical. It allows for easy stacking one in the other once they have been emptied. In another embodiment also addressing the issue of disposing of and stacking the used cartridges, the discharge means comprise cartridge opening means which create at least one longitudinal cut or breaking line on the surface of the cartridge thus allowing for an easy stacking of cylindrical cartridges.

DETAILED DESCRIPTION OF THE INVENTION

The present invention will be further described with reference to the accompanying drawings wherein:

FIG. 1 represents a 3D schematic view of storing means according to the invention.

FIG. 3 represents a schematic view illustrating the delivery means in operation.

Figure 2:
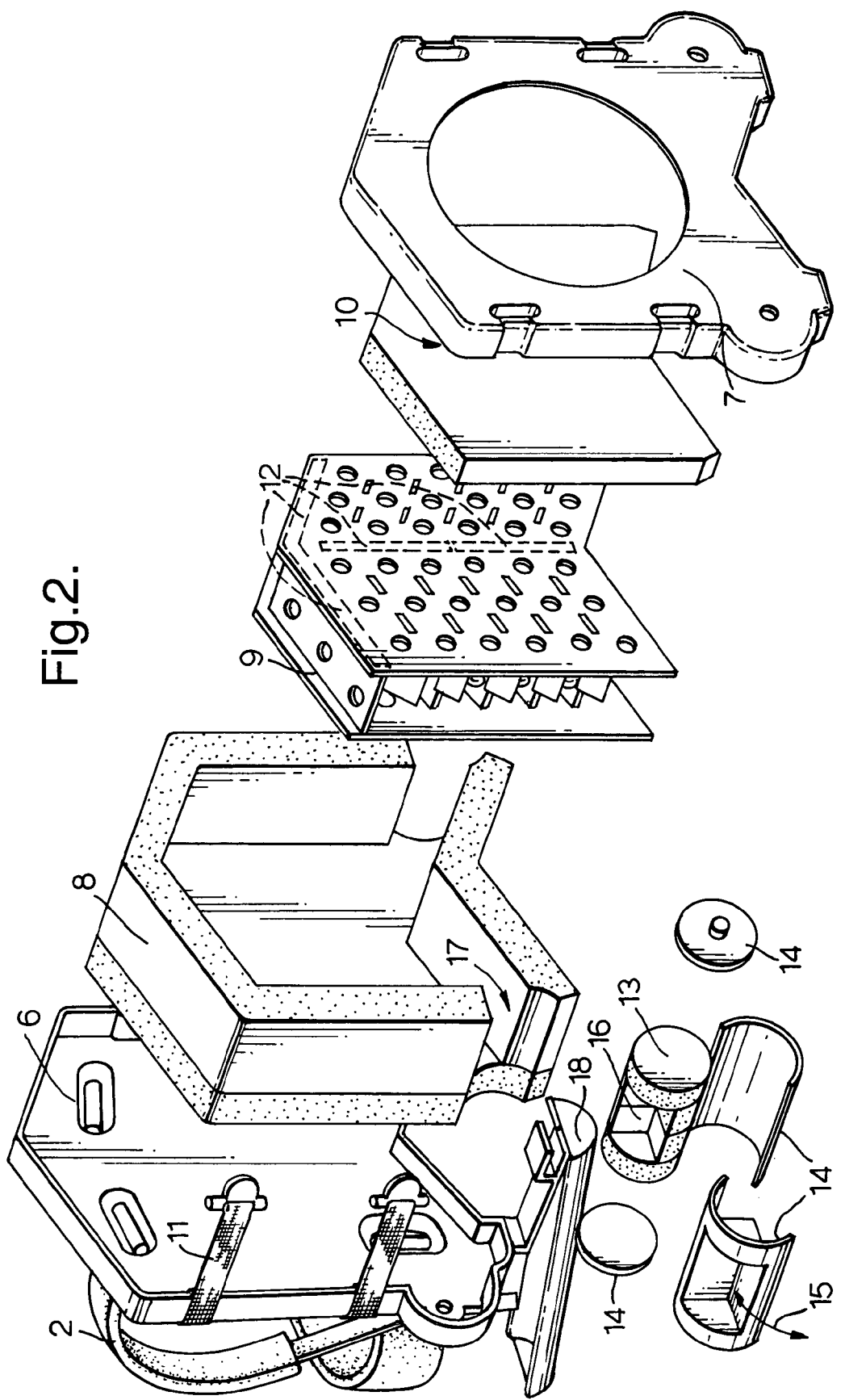
FIG. 2 represents a 3D exploded view of storing means according to the invention.

As it can be seen in FIG. 1, thermally insulated storing means 1 are typically constituted by a harness 2 and a thermally insulated casing 3. This harness is adapted to fit on the back of an operator. Near the bottom of this thermally insulated casing are two delivery means 4 adapted to individually deliver single dose cartridges 5. The harness can also be fitted with a wafer cone holder not represented, from which individual cones will be taken and into which ice frozen aerated product contained in single dose cartridges will be dispensed.

Single dose cartridges can be cylindrical cartridge as described in WO 01/19205. In a preferred embodiment they are frusto conical. It allows for an easy stacking of used cartridges 5 one into another.

As illustrated in FIG. 2, storing means 1 typically comprised by a carrying shell 6, secured to the harness 2, and a rear cover 7. Between the carrying shell 6 and the rear cover 7 is located an insulating box 8, the inside of it being adapted to receive a cartridge cascade mechanism 9 which when put inside the insulated box is further covered by a rear insulating panel 10 made from a thermally insulating material generally similar to the one constituting the box 8. All these elements constituting the storing means are maintained together by elastic straps 11. Between the insulated box 8 and the cascade mechanism 9 are preferably disposed cooling means 12, indicated in phantom lines on FIG. 2, which are preferably situated at the top of the cascade mechanism 9 and on its two lateral sides perpendicular to the carrying shell 6 and the rear cover 7 but which can also, in a less preferred embodiment, be located as disclosed on FIG. 2. The cooling means 12 are preferably in the form of plastic containers filled with a suitable phase change material, preferably a eutectic material.

Near the bottom of the insulating box 8 are two openings 17, each of them adapted to let an individual cartridge, located in the cartridge cascade mechanism 9, entering delivery means 4. The presence of two delivery means 4 allows for the cascade mechanism to be loaded with two different type of cartridges, each type corresponding, for example to a different flavour.

As illustrated in FIG. 2, the delivery means 4 typically comprises a tumbler 13 made from an insulating material, preferably similar to the one used for the box 8 and the panel 10, e.g. polyurethane foam. This tumbler 13, is covered by a plastic shell 14, the shell 14 presents an opening 15 adapted to correspond with a cartridge well 16 in the tumbler 13. The tumbler 13 together with its shell 14 is mounted rotatable around an axis parallel to the axis of the cartridges located in the cartridge cascade mechanism 9.

As illustrated in FIG. 3, in order to take a single dose cartridge out of the storing means, the tumbler 13 is put in a position wherein an individual cartridge 5 is allowed to enter into the cartridge well 16. The tumbler is then rotated and the cartridge is allowed to fall from the tumbler onto a cartridge chute 18 described on FIG. 2.

Figure 4:
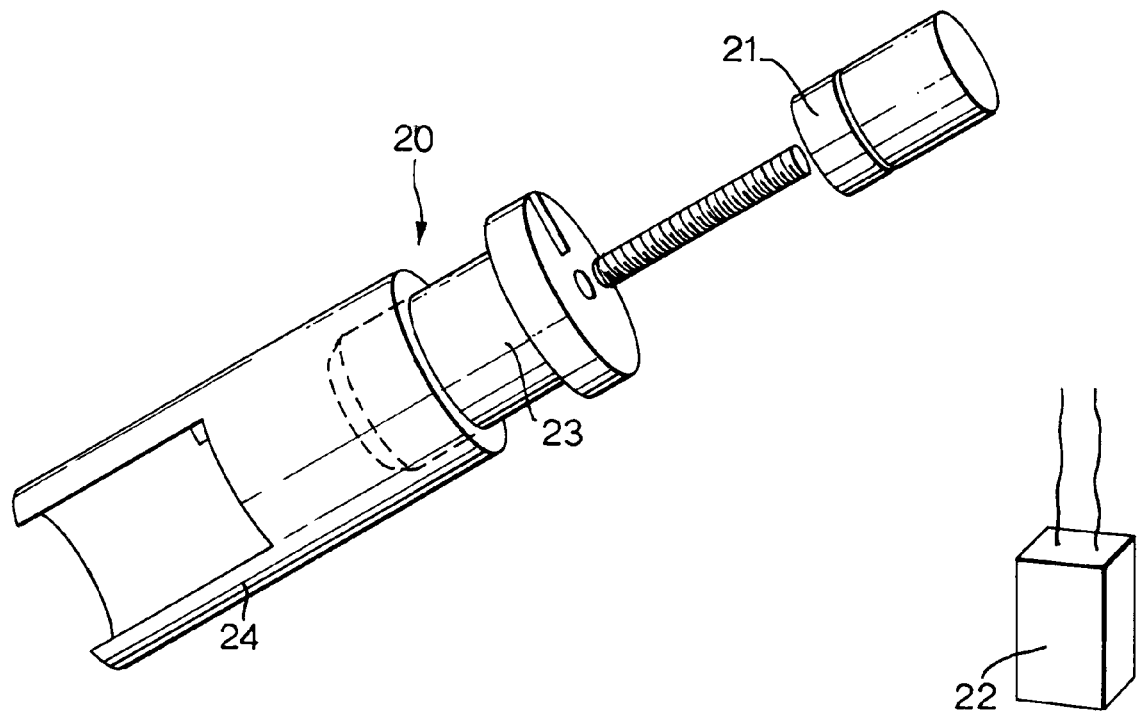
FIG. 4 represents a schematic exploded 3D view of dispensing means according to the invention.

As illustrated in FIG. 4, dispensing means 20 with an electric motor 21 connected to a battery 22 and adapted to actuate a dispensing pusher 23 inside a casing 24 into which a cartridge (not represented) has been first introduced. A switch mechanism (not represented) activates the motor 21. This dispensing means is adapted to be hold and activated by a single hand.

The operation of a device according to the invention is now going to be disclosed.

Before a vending session begins, the storing means are opened. Straps 11 are released and the rear cover 7 together with the insulating panel 10 are removed. Then either a new cascade mechanism 9, full with single dose cartridges is put in place of the old one or the rear panel 19 of the cascade mechanism 9 is removed and new cartridges are put manually in the cascade 9. Once it is completed, new cooling means 12 are introduced and fitted. The insulating panel 10 and the rear cover 7 are put back in place and the straps 11 are re-fitted.

If necessary a new battery 22 is fitted and the whole system is ready for use.

During a vending session, on demand, delivery means 4 are actuated and a single-dose cartridge 5 containing is removed from the thermally insulated casing 3. This cartridge 5 is then introduced in the dispensing means 20 and the motor 21 is activating leading to the ice cream to be discharge from the cartridge into a chosen container which can be, for example, a wafer cone.

At the end of a vending session, the storing means are opened, cooling means 12 are removed and stored into a freezer for 're-loading' and the unused single dose cartridges are removed and put into an appropriate freezer for storage until a further vending session.

What is claimed is:

1. Portable dispenser for dispensing frozen aerated edible product from single dose cartridges containing said frozen aerated edible product, said dispenser comprising;

Thermally insulated storing means for storing single dose cartridges containing said frozen aerated edible product, said thermally insulated storing means to be mounted on the back of a person, and Dispensing means capable of holding a single dose cartridge containing said frozen aerated edible product outside the storing means, said dispensing means comprising discharge means capable of discharging frozen aerated edible product out of said single dose cartridge, and the thermally insulated storing means comprising delivery means to deliver individual single dose cartridges containing frozen aerated edible product.

2. Portable dispenser according to claim 1 in which the dispensing means are independent from the storing means.

3. Portable dispenser according to claim 2 in which the dispensing means are to be mounted on the front of the person.

4. Portable dispenser according to claim 3 in which the dispensing means are single-handed actuated.

5. Portable dispenser according to claim 1 in which the thermally insulated storing means contains cooling means.

6. Portable dispenser according to claim 1 in which delivery means are situated at a bottom of the storing means.

7. Portable dispenser according to claim 1 in which the single dose cartridges are frusto-conical.

* * * * *